United States Patent [19] | [11] 4,320,435
Jones | [45] Mar. 16, 1982

[54] SURGE ARRESTER ASSEMBLY

[75] Inventor: Raymond D. Jones, Cheam, England

[73] Assignee: TII Industries, Inc., Lindenhurst, N.Y.

[21] Appl. No.: 18,360

[22] Filed: Mar. 6, 1979

[51] Int. Cl.³ .............................................. H02H 3/22
[52] U.S. Cl. .................................... 361/119; 361/120
[58] Field of Search ................ 361/117, 119, 120, 129

[56] References Cited

U.S. PATENT DOCUMENTS

| | | | |
|---|---|---|---|
| 2,044,591 | 6/1936 | Penning . | |
| 3,543,207 | 11/1970 | Kawiecki . | |
| 3,569,786 | 3/1971 | Kunugi . | |
| 3,649,874 | 3/1972 | Peche . | |
| 3,651,380 | 3/1972 | Peche . | |
| 3,703,665 | 11/1972 | Yereance . | |
| 3,755,715 | 8/1973 | Klayum et al. | 361/120 |
| 3,898,533 | 8/1975 | Scudner, Jr. . | |
| 4,002,952 | 1/1977 | Menninga . | |
| 4,009,422 | 2/1977 | Woodfill . | |
| 4,051,546 | 9/1977 | Scheithauer . | |
| 4,062,054 | 12/1977 | Simokat | 361/119 |
| 4,063,127 | 12/1977 | Le Cain et al. . | |
| 4,132,915 | 1/1979 | Wilms | 361/124 X |
| 4,158,869 | 6/1979 | Gilberts | 361/119 X |

*Primary Examiner*—Harry E. Moose, Jr.
*Attorney, Agent, or Firm*—Morgan, Finnegan, Pine, Foley & Lee

[57] ABSTRACT

A screw-in station protector assembly includes a carrier housing containing a shorting cage which is biased by a compression to urge the cage and gas tube arrester assembly outwardly. The gas tube assembly contained within the cage includes a two electrode gas tube and a sealed external back-up air gap protector. The screw-in assembly is particularly adapted for retro-fitting/replacement of carbon block arresters without modification.

29 Claims, 20 Drawing Figures

SURGE ARRESTER ASSEMBLY

CROSS-REFERENCE TO RELATED APPLICATIONS

The application is related to Applications Ser. Nos. 719,077, filed Aug. 31, 1976 and 843,320 filed Oct. 19, 1977, the disclosures of which are incorporated herein.

BACKGROUND

Gas tube overvoltage protectors are widely used for the protection of equipment from overvoltage conditions which may be caused by lightning, high voltage line contact, and the like.

It is also a widely practiced technique to associate various fail-safe arrangements with such tubes and with other types of protectors, e.g., air gap arresters, to meet various contingencies. For example, the presence of a sustained overload, as where a power line has come in continued contact with a protected telephone line, produces a concomitant sustained ionization of the gas tube and the resultant passage of heavy currents through the tube. Such currents will in many cases destroy the overvoltage protector and may also constitute a fire hazard.

One common approach to this problem is to employ fusible elements which fuse in the presence of such overloads and provide either a permanent short circuiting of the arrester directly, or function to release another mechanism, e.g., a spring loaded shorting member, which provides the short circuit connection (commonly, the arrester electrodes are both shorted and grounded). The presence of the permanent short and ground condition serves to flag attention to that condition thus signalling the need for its inspection or replacement. Examples of this type of fail-safe protection are found in U.S. Pat. Nos. 3,254,179; 3,281,625; 3,340,431; 3,396,343; and 3,522,570. Several of these patents also incorporate with the fail-safe feature, a backup air gap arrangement so that there is both fail-safe fusible (short) type protection as well as backup air gap protection. Other types of screw-in or well type arresters are described in U.S. Pat. Nos. 3,543,207 and 3,703,665.

Still another approach, disclosed in commonly assigned application Ser. No. 719,077, is based on the discoveries that an effective fail-safe function can be achieved by employing a non-metallic fusible material and that important advantages are consequently realized. The fusible material is an electrical insulator which in the exemplary embodiments is interposed between one or more of the electrodes and the shorting mechanism. Surprisingly, the response of the non-metallic material to thermal conditions is precise and, moreover, does not leave an insulative film in the course of fusing which might otherwise interfere with the short circuit contact.

The need exists, nonetheless, to develop improved fail-safe arrangements which provide both surge and failure protection for gas tube arresters particularly for retrofitting existing station protectors.

SUMMARY

The present invention is directed to fail-safe surge arrester assembly in which both improved surge and air gap back-up protection is provided with economically producible systems.

Accordingly, the present invention may be summarized as follows: an electrical overvoltage arrester for protecting telephone and the like equipment from voltage surges transmitted by lines associating with such equipment, adapted to fit in a station protector housing having a pair of contacts one of which is threaded and which are separated by an insulator, a conductive holder, adapted and arranged to be threadably engaged in said station protector and into contact with one of the contacts; a conductive cage element within the holder and biased in a direction opposite said contact terminal; a gas tube subassembly and fusible alloy pellet contained within the cage including a gas filled housing having two electrodes; and an external air gap on the gas tube and interconnecting the electrodes thereof.

DETAILED DESCRIPTION

Figure 1:
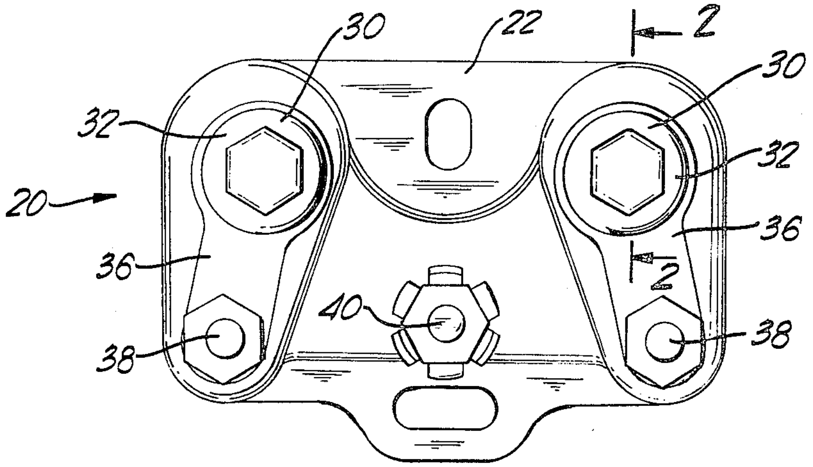
FIG. 1 is a top plan view of a surge arrester assembly in accordance with the present invention.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

Figure 2:
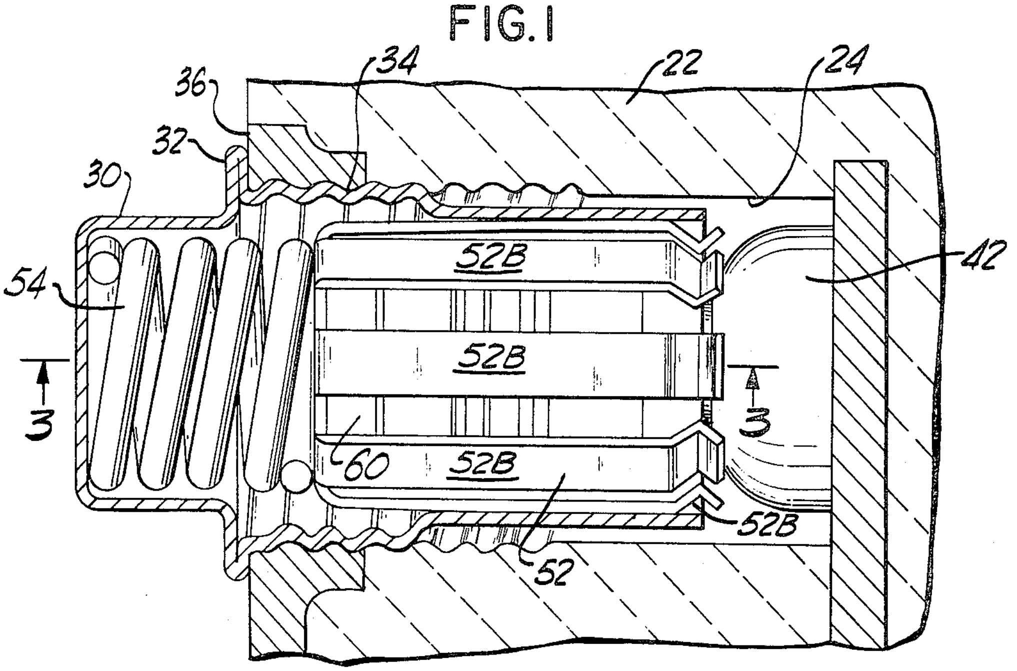
FIG. 2 is an enlarged partial cross-sectional view taken generally along line 2—2 in FIG. 1.

FIG. 1 shows a station protector assembly 20 which includes an insulating base number 22 having a pair of chambers 24 thereon for receiving externally threaded conductive holders 30. As best illustrated in FIG. 2, holder 30 includes a shoulder 32 just above threaded portion 34 so that the holder may be threadably engaged with the thread formed in bus conductor 36 and chamber 24 and drawn up with shoulder 32 bracing upon bus conductor 36. Each bus 36 is embedded in base 22 and provide electrical contact with stud 38.

A line wire of the circuit to be protected is connected to each stud 38. A ground wire is also connected to stud 40. Stud 40 is in electrical connection with a lower button contact 42 in each chamber 24.

Station protector assembly 20 is well known in the art of telephone protector and widely used. Typical example would be protector bases sold by Western Electric under designation 123AlA, and 128AlA-2.

A two-electrode gas tube surge arrester assembly 50 of the type described below is contained within the cylindrical portion of holder 30. More particularly, the assembly 50 is contained within a cage 52 which is biased by compression spring 54 toward contact 42 when the holder 30 is screwed into bus 36 and chamber 24.

Figure 3:
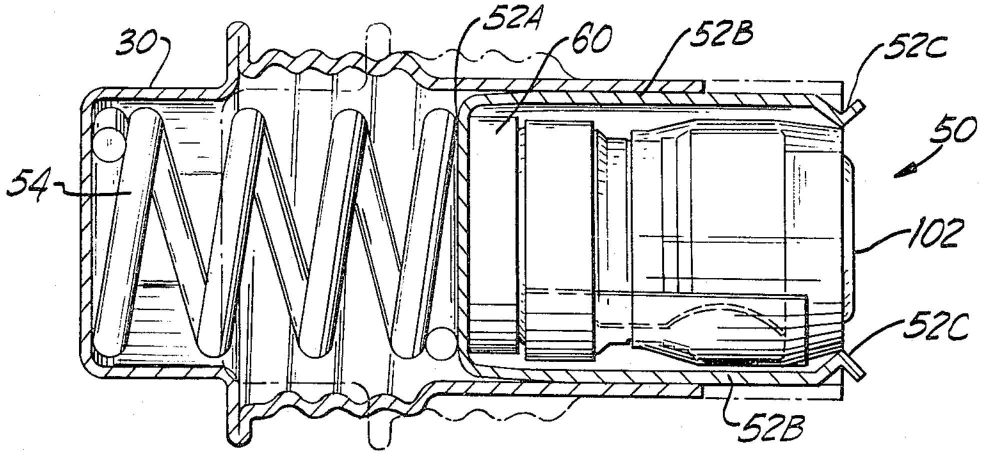
FIG. 3 is a cross-sectional view similar to FIG. 2, illustrating the arrester subassembly removed from the assembly and with the short circuit cage in cross-section for clarity of illustration of the gas tube assembly.
Figure 7:
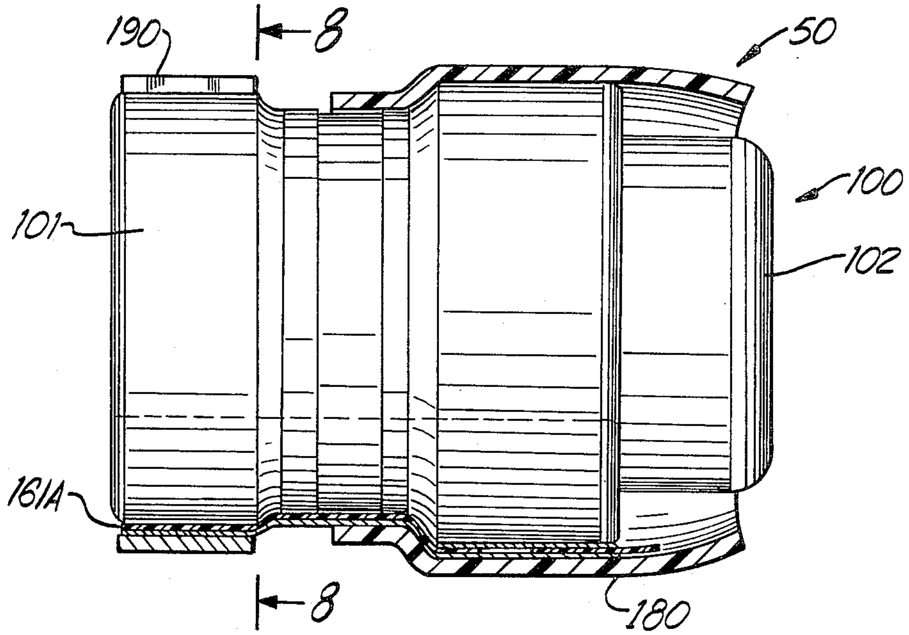
FIG. 7 is a side view of the gas tube equipped with back-up air gap assembly with certain portion in cross-section for clarity of illustration.

Cage 52 includes a base portion 52A and a plurality of leg protrusions 52B extending in a generally cylindrical configuration about gas tube assembly 50. The end portions 52C of each leg 52B define radially inwardly directed contacts. The leg portions 52B are in sliding electrical contact with the interior surface of metal holder 30 so as to provide an electrical connection between the holder and one end electrode of the gas tube assembly 50. One cap or connection of the gas tube assembly 50 illustrated in FIG. 2, 3 and 7, is maintained in electrical contact with base 52A by a fusible element 60. In other embodiments, described below, the gas tube may be in direct contact with the cage. Also other configurations for cage 52 which provide the features outlined may be used.

The installation of holder 30 in base 20 results in spring 54 biasing cage 52 toward contact 42, and maintains one electrode of gas tube assembly in electrical contact with the cage (and holder) and the other electrode 102 in electrical connection with contact 42, FIG. 2, thereby placing the gas tube assembly in series between the line contact 38 and ground 40.

Sustained overload of the gas tube assembly will result in the generation of heat, which causes solder pellet 60 to fuse. When fusible element 60 fuses, cage 52 moves in the direction of and into electrical contact with bottom contact 42. Thus, fail/safe shaft circuiting occurs between cage contacts 52C and contact 42 in known manner.

During normal operation, fusible element 60 maintains contact portions 52C in spaced relationship from contact 42 as illustrated in FIG. 2. The contacts are spaced a sufficient distance to prevent accidental arcing between them and contact 42.

Figure 8:
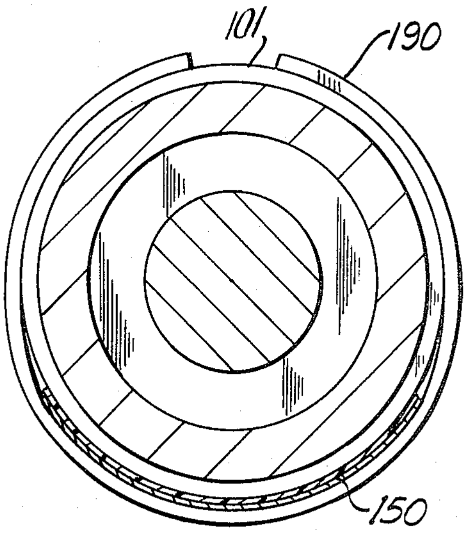
FIG. 8 is a cross-sectional view taken along line 8—8 in FIG. 7.
Figure 9:
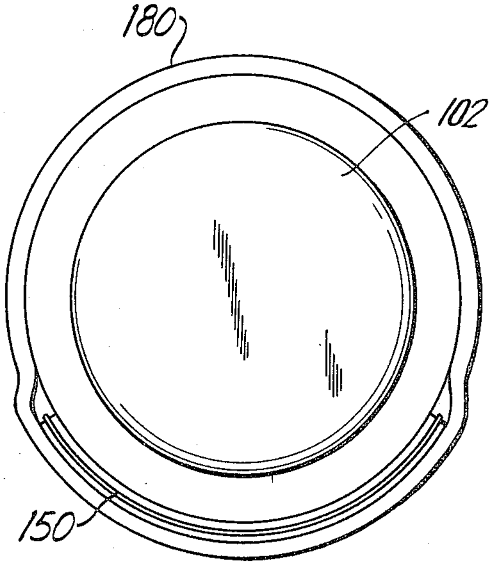
FIG. 9 is a right hand end view of the gas tube assembly of FIG. 7.
Figure 10:
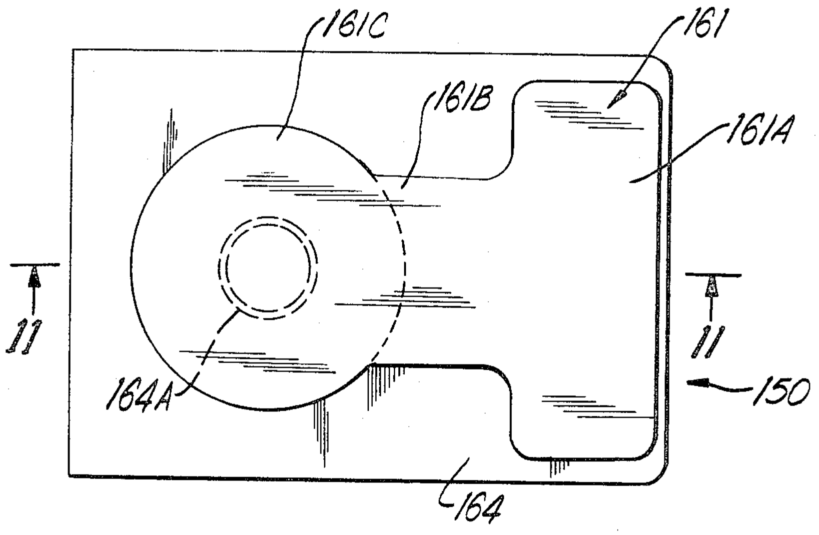
FIG. 10 is an enlarged, top plan view of the back up air gap assembly.
Figure 11:
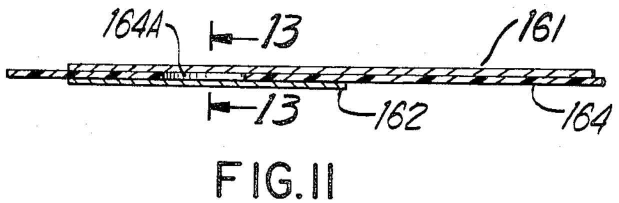
FIG. 11 is a cross-sectional view taken generally along line 11—11 in FIG. 10.
Figure 12:
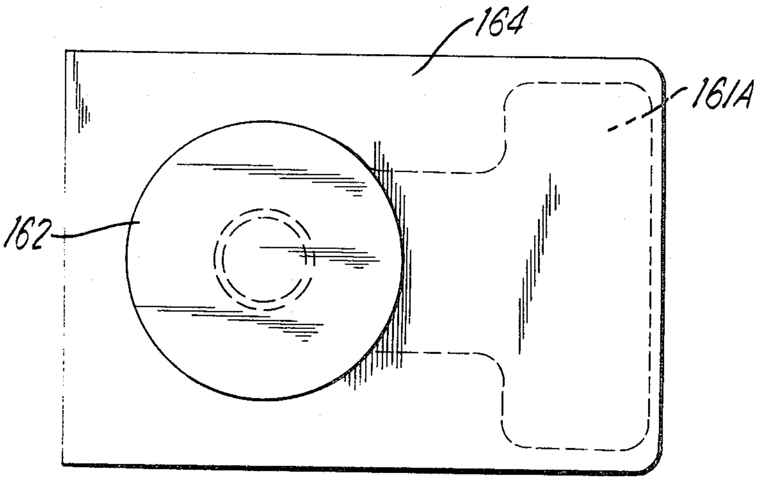
FIG. 12 is a bottom plan view of the back-up air gap assembly of FIG. 10.

FIGS. 7–9 illustrate the gas tube assembly 50 which includes a gas tube arrester 100, a back up air gap assembly 150, a shrink fit insulating sleeve 180 positioned about one electrode of gas tube 100 with a portion of assembly 150 positioned therebetween, and a retainer clip 190 in electrical contact with another electrode 101 of tube 100 with a portion of assembly 150 disposed therebetween.

Figure 4:
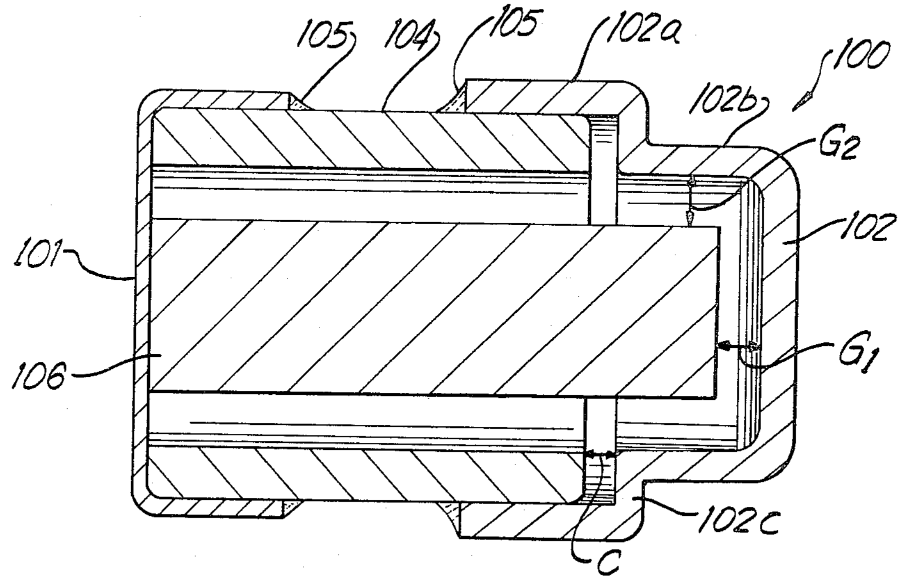
FIG. 4 is a longitudinal cross-sectional view of an enlarged scale of a two electrode gas tube.
Figure 5:
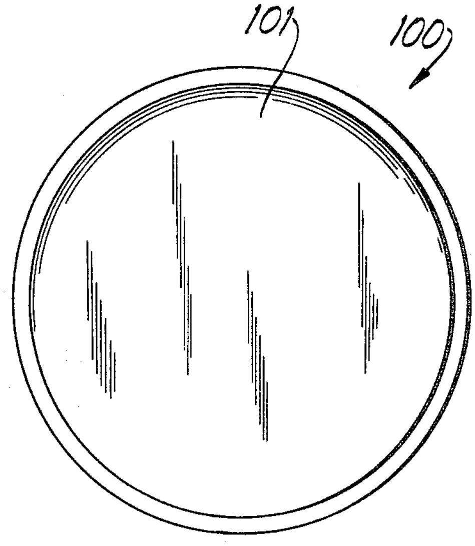
FIGS. 5 and 6 are left and right end views of the gas tube in FIG. 4.
Figure 6:
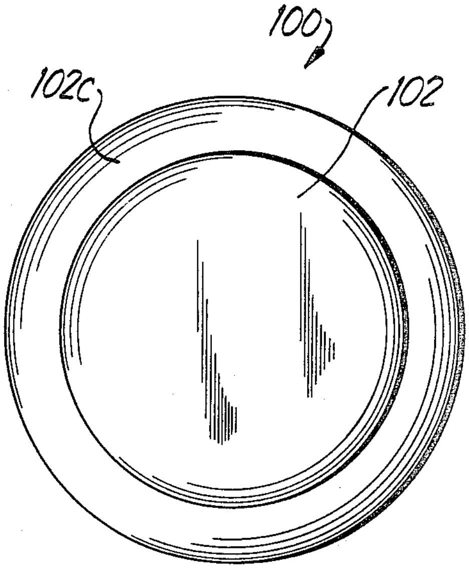

FIGS. 4–6 show the gas tube 100 which is a two electrode arrester of the gas type. Tube 100 includes a pair of end caps 101 and 102 which are joined to a ceramic cylinder 104 by braze 105. Ceramic cylinder 104 may have its outer surface metallized to facilitate the brazing and sealing.

End cap 101 has a circular end portion and a cylindrical wall portion within which is positioned sleeve 104. End cap 101 has a centrally disposed electrode rod 106 extending therefrom and axially within ceramic sleeve 104. The free end of rod 106 extends beyond sleeve 104.

End cap 102 includes a first cylindrical wall portion 102*a* which receives sleeve 104 and a reduced diameter portion 102*b* and a generally circular end portion. The discharge gap G1 of arrester 100 may be defined by the space between the free end of rod 106 and the interior surface of the end portion of cap 102 by making this distance less than that defined by the space G2 between the cylindrical surface of rod 106 and the interior cylindrical surface of electrode portion 102*b*. Alternatively by making distance G1 appreciably larger than distance G2, the discharge gap will be as defined for G2.

The configuration of tube 100 is particularly useful in fabrication since the overall length of the assembly and the gap length G1 can be controlled when pressing electrode caps 101 and 102 on to the sleeve (tube) 104 also leaving a controlled clearance C between the end of ceramic sleeve 104 and the shoulder 102*c* in end cap 102. Clearance C is provided to extend the surge life of the tube. The configuration of end cap 102 while providing the internal gap control also provides the necessary insulating clearance between the outside diameter of portion 102*b* of electrode cap 102 and the contact portions 52*c* of cage fingers 52B.

The ionizable gas is charged into tube 100 by techniques known in the art. For example, vacuum charging.

In the presence of overvoltage conditions the gas in tube 100 ionizes thereby creating, in known manner, conductive shunting paths between the line of the protected circuit and ground (via the respective terminals 36 and 42).

The air gap assembly 150 is shown in detail in FIGS. 10–13 which is formed by the conductive layers 161 and 162 and an insulating layer 164. The components are shaped and arranged for conforming to the gas tube and provide proper contact therewith.

More specifically, first conductive layer 161, e.g. of copper, which may be treated with oxide finish to assist adhesion includes a contact portion 161A of generally rectangular shape. A neck portion 161B connects portion 161A to a generally circular shape portion 161C overlying the aperture 164A described below.

Correspondingly, second conductive layer 162 includes a circular shaped portion 162A concentric with aperture 164A to form a sealed air gap between conductive layers 161 and 162.

Insulating layer 164 is generally rectangular in shape and interposed between layers 161 and 162. Layer 164 is larger in dimension that layers 161 and 162 so that the insulator extends beyond the peripheries thereof to prevent discharging or leakage over its edge. Insulating layer 164 may consist of a thermoplastic material such as FEP described below which can be bonded to conductive layers 161 and 162 by heating under pressure.

Figure 13:
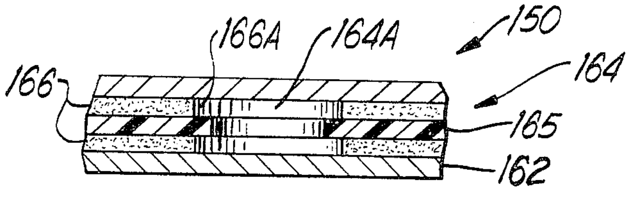
FIG. 13 is an enlarged cross-sectional view taken generally along line 13—13 in FIG. 11.

Moreover, with particular reference to FIG. 13, the insulating layer 164 may comprise a layer 165 of plastic material of the types described below and is faced on earth surface with an adhesive layer 166 which bonds the layer 165 to the associated conductive layers 161 and 162. The edges 166A of the adhesive layer adjacent the hole 164A in the plastic layer 165 may be set back a short distance. By way of illustration, with a hole diameter of 0.05 inch in the plastic layer 165, a set back of 0.005 inch provides sufficient clearance. The set back clearance ameliorates the possibility of the adhesive flowing into the aperture 164A during assembly. Moreover, the air gap dimension, e.g. 3 mils, must take into account the thickness of the adhesive, for example when the adhesive layers 166 are 1 mil thick, a plastic layer 165 of 1 mil is used to achieve a 3 mil air gap between conductive layers 161 and 162. The set back of the adhesive also functions to prevent bridging or short circuiting of the air gap which might occur as a result of electrical discharges over the surface of the adhesive if it entered the air gap aperture.

Layer 164 or 165 and 166 are of non-metallic, electrically insulative composition. Suitable materials will have melt temperatures in the range corresponding to thermal conditions at arrester thermal overload and will have suitable dielectric strength, dielectric constant, dissipation factor and volume and surface resistivity to provide the requisite insulative function. The preferred material should also be free of embrittlement or plastic flow due to aging and high ambient temperature effects, be non-inflammable under the overload conditions, have good mechanical properties and be inert to corrosives and weather.

Exemplary of such classes of materials are certain of the fluroplastics, such as fluorinated ethylene propylene polymer (FEP), the polymer perfluoroalkoxy (PFA), the modified copolymer of ethylene and tetrafluoroethylene (ETFE) (marketed under the DuPont Company trademark Tefzel), and poly ethylene-chlorotrifluoroethylene (E-CTFE copolymer) marketed under the Allied Chemical Corporation mark Halfar. (The fluoroplastic polytetrafluoroethylene (TFE), on the other hand, does not have suitable melt properties for the thermoplastic application.) In the examples, layer 164 is formed of FEP film and layer 165 is formed of polyimide film coated with thermosetting adhesive layers 166 marketed under the DuPont Company Trademark - Pyralux type WA/K.

Referring once again to FIGS. 7–9, air gap assembly 150, is mounted on gas tube 100 by sleeve 180 and ring 190. Assembly 150 is positioned such that metal layer 161 is in direct contact with clip 190 and thus in electrical contact with end cap 101. Metallic layer (circle) 162 is in direct contact with electrode 102 and held by a shrinkable sleeve 180, e.g. FEP heat shrinkable tubing.

During normal operation of the arrester, transient surges produce ionization in the normal manner to protect the subject equipment. If, however, a sustained surge condition occurs as where a linc is permanently contacted by a higher voltage line, the resultant ionization currents flowing through the arrester produce excessive heat; the fusible element 60, placed in the arrester region to respond to this heating, thereby fuses. As this occurs, cage fingers 52, and in particular the contact sections 52C thereof, move into contact with button 42. When electrical contact is made a short circuit is established between the button 42 and terminal 36 thus providing a fail-safe (short) action. The breakdown voltage of the gas tube arrester is arranged to be less than that of the air gap described so that the air gap normally will not operate.

The air gap 164A between layer 161 and layer 162 provides back-up protection in the event of gas tube failure. With this additional provision a failure of the gas tube in the open mode, as for example by reason of a gas leak, does not result in a loss of protection; the air gap provides back-up protection prior to arrester replacement.

Figure 14:
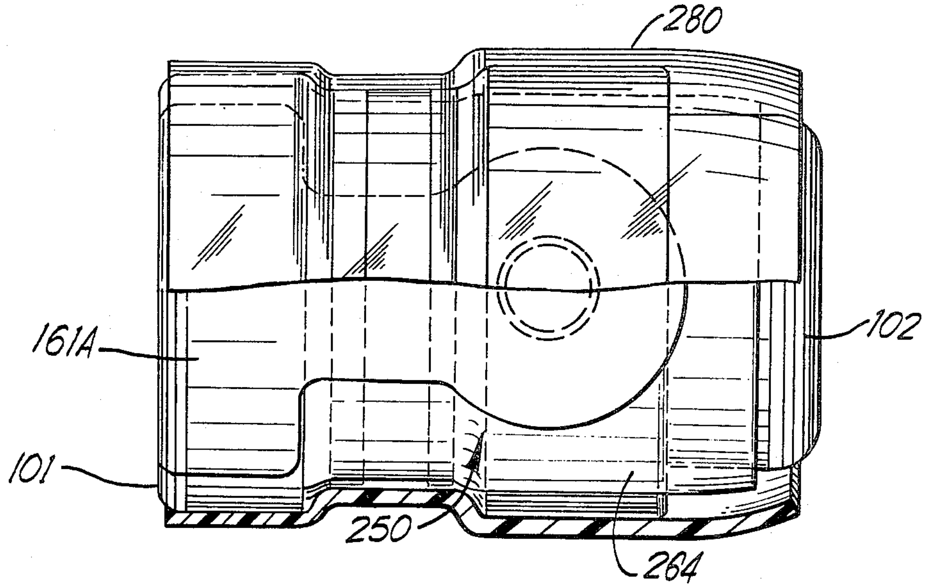
FIG. 14 is a side view of an alternative gas tube assembly similar to that shown in FIG. 7.
Figure 15:
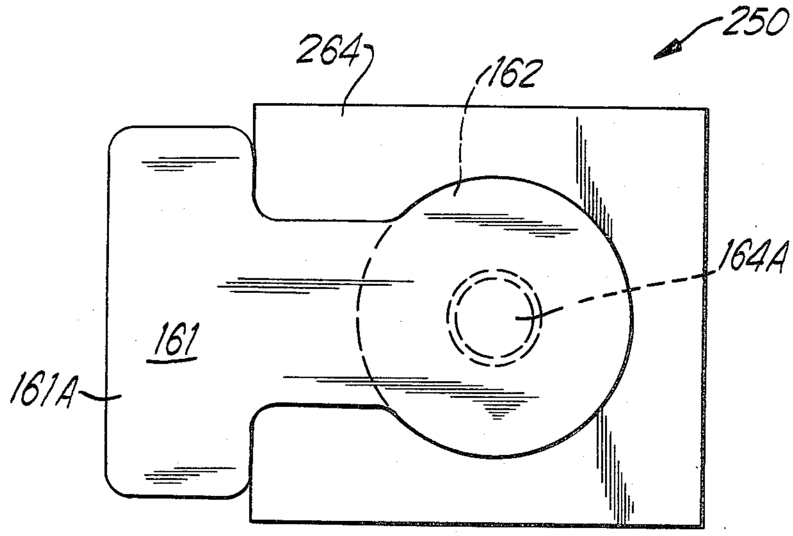
FIG. 15 is an enlarged, top plan view of the air-gap subassembly shown in FIG. 14.

FIGS. 14–15 illustrate an alternative air gap assembly 250. In this embodiment the air gap assembly is similar to that described with regard to FIGS. 10–13 and corresponding parts have been corresponding numbered. The only difference in FIG. 15 is that insulating layer 264 is shorter than layer 164 so that no insulator is beneath portion 161A of layer 161.

This configuration of air gap assembly permits the elimination of metallic clip 190 (FIG. 7). As shown in FIG. 14, layer portion 161A is in direct contact with end cap 101 and held in position by heat shrinkable sleeve 280, which extends over substantially the entire length of the gas tube leaving only the ends of end caps 101 and 102 exposed.

Figure 16:
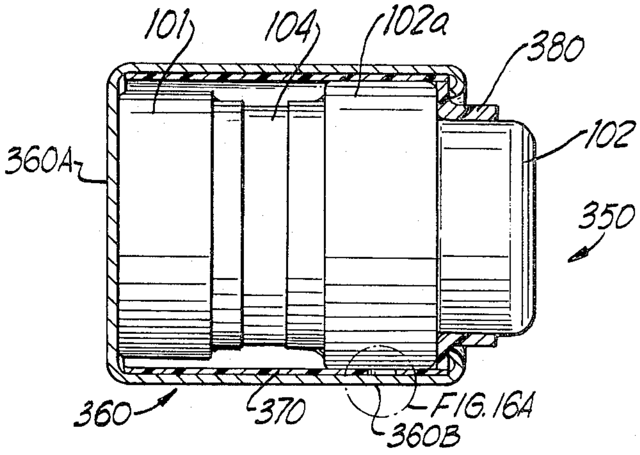
FIG. 16 is a side view of another alternative gas tube assembly with back-up air gap subassembly with certain portions in cross-section.
Figure 16A:
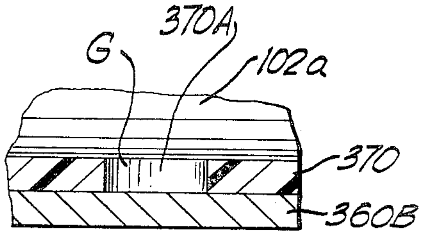
FIG. 16A is an enlarged cross-sectional view of the back-up air gap in FIG. 16.
Figure 19:
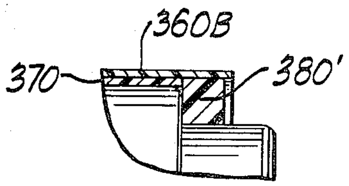
FIG. 19 is a fragmentary view of an alternative means for joining the extended air gap casing to the gas tube similar to that shown in FIG. 16.

FIGS. 16, 16A and 19 show another gas tube arrester embodiment 350 with an external air gap, which may also be used in place of assembly 50 in the cage structure shown in FIGS. 2 and 3. Assembly 350 includes a gas tube 100 of the type previously described. In place of the air gap assemblies previously described, a metallic cylinder 360 and insulating sleeve 370 is utilized.

Sleeve 370 is composed of the same types of material described for layers 164 and 264. Sleeve 370 is slid over the enlarged diameter portion **102*a* of end cap 102 and may be retained thereon as by shrink fit. Then the gas tube 100, with sleeve 370 in place, is placed in an open-topped cylinder 360 such that end cap 101 is in contact with the end 360A of cylinder 360. The walls 360B of the cylinder extend approximately the length of the gas tube and beyond shoulder 102*a* to 102*c*. For accurate control of the air gap there should be zero clearance between the outer surface of sleeve 370 and the inner surface of cylinder wall 360B in the area of electrode portion 102*a*. This may be accomplished by sizing portion 102*a* to have the largest diameter on the gas tube, or the thin wall 360B** may be sized before assembly or crimped inwardly at positions where the gap is to be formed.

As best shown in FIG. 16A, sleeve 370 includes at least one aperture 370A which defines an air gap G distance between portion **102*a* and cylinder wall 360B**.

Cylinder 360 may be retained on the gas tube 100 in a number of ways. As shown in FIG. 16, an insulating bushing 380 is positioned on the shoulder **102*c* and extended part way along reduced diameter portion 102*b*. The free end of the cylinder wall 360B is formed over and around shoulder 102*c* and into engagement with the bushing 380** thereby forming a single unit.

Alternatively, rather than forming the end of cylinder wall 360B, an epoxy resin fill 380 may be used to fix and seal cylinder 360 to gas tube 100 as shown in FIG. 19. This epoxy resin compound is commonly used in the art for potting purposes.

Figure 17:
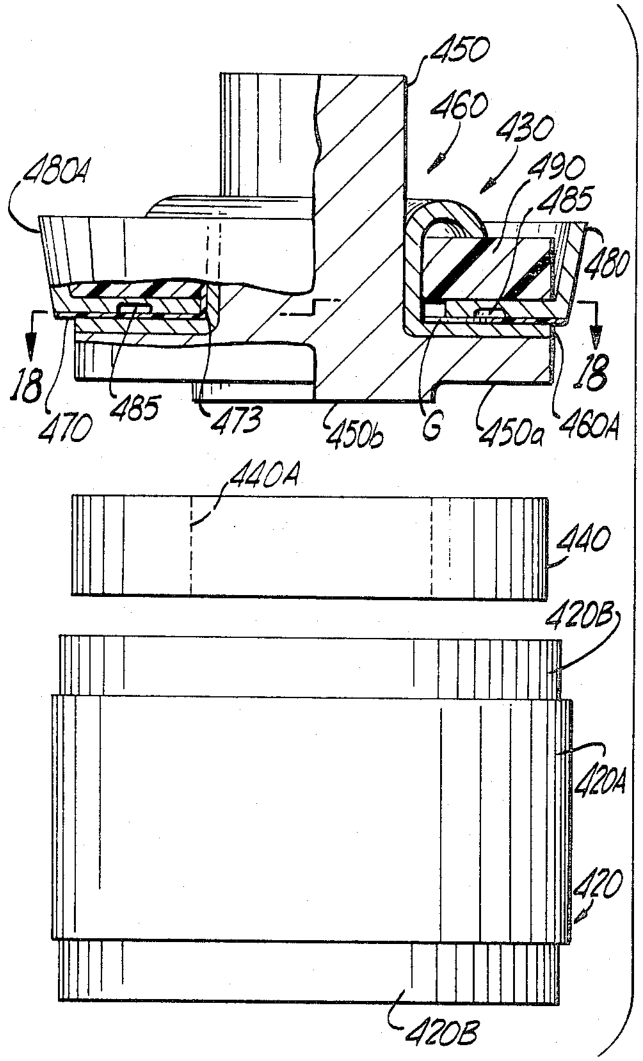
FIG. 17 is an exploded, elevation view, with certain portions in fragmentary cross-section illustrating a still further gas-tube embodiment.
Figure 18:
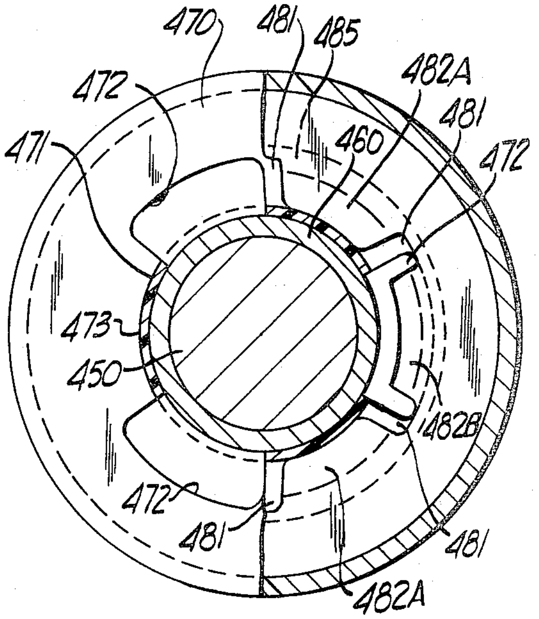
FIG. 18 is a cross-sectional view taken generally along line 18—18 in FIG. 17.

FIGS. 17 and 18 show still a further alternative gas tube assembly 400 with external air gap suitable for use in the cage shown in FIG. 1.

The arrester 420, which is of known construction and may comprise for example TII Model 39, (covered by U.S. Pat. No. 3,818,259, incorporated herein), has its end electrodes (not shown) extending inwardly from the end caps 420B toward the center of the tube interior to define a gap between the electrodes. The end caps 420B are separated by a ceramic sleeve 420A.

Arrester 420 carries a combination contact/air gap assembly 430 which enables the arrester to be of the proper size for use in the station protector of FIG. 1 and holder assembly of FIGS. 2 and 3. Assembly 430 is joined to or in contact with arrester 420 by means of a fusible alloy pellet or disc 440 having a central bore 440A.

Assembly 430 includes a conductor element 450 having a generally cylindrical shape with a laterally extending disc like portion **450*a* upon which the air gap elements are carried. Extending downwardly from disc-like portion 450*a* is a central boss 450*b* which is received in bore 440A** to locate and interconnect the elements.

A metal rivet 460 is positioned on the top surface of disc-like portion **450*a* and extends upwardly along and in contact with conductor 450. The top surface of flange portion 460A of the rivet is a mounting surface for three elements, namely, insulating layer 470, conductive dished washer 480 and insulation/spacer element 490. As explained below, a plurality of air gaps G are formed by layer 470 between portion 460A and disc 480**.

With particular reference to FIG. 18, insulation layer 470 has a generally circular shape and is formed of an insulating material, e.g. Kapton Type F film with F.E.P. coating on both sides with a total thickness of 0.003"–0.004". The center of circular layer 470 includes a central cutout 471 through which passes conductor 450 and rivet 460. Three generally triangular shaped cutouts 472 extend radially outwardly from central cut out 471. These cutouts 472 are spaced at 120° intervals to provide three air gap apertures. The insulating layer material between cutouts 472 form three generally triangular shaped tabs 473 which abut rivet 460 to provide a spacer effect. In this manner washer 480 is centered on and insulated from rivet 460 by the three spacer tabs 473 positioned therebetween.

Washer 480 is generally circular in configuration with an upwardly and outwardly extending rim 480A. Washer 480 is formed of a metal conductor, e.g. brass ASTM 836 AL 6½ hard with copper plate finish. Rim 480A is in electrical contact with cage 52 when the assembly 400 is placed therein. Washer 480 includes a centrally positioned, generally circular shaped clearance for rivet 460, and a plurality (6) of cut-outs 481 which define six tab portions 482A and 482B. Tab portions 482A and 482B are equispaced, i.e. 60°, the three tab portions 482A engage the spacer tabs 473 to center washer 480 as described above, and tab portions 482B and overlie insulation cutouts 472. In this manner an air gap is formed between the bottom surface of each tab 482 and the top surface of rivet 470.

The under surface of washer 480 preferably includes a circular clearance groove 485, which segregates the tab portions 482 from the remainder of the washer. The groove 485 serves to increase the gap distance where the tab portions 482B extend over the edges of cut outs 472 in insulation layer 471 and prevent uncontrolled arcing at or near these edges.

An insulation washer 490 preferably of resilient material is positioned over washer 480. The entire air gap assembly is unitized by turning the upper end of rivet 460 into engagement with insulator 490. In this manner, rivet 460, insulation layer 470, washer 480 and insulation disc 490 are a unit which may be separated from conductor 450 for repair/replacement and separately fabricated and tested. Additionally, this assembly contains the air gaps in a sealable manner to exclude entry of dust and foreign particles, and with suitable resin coating, to exclude moisture.

The material for washer 470 given in the example contains FEP layers on each surface, these layers may be used to seal to surfaces of flange 460A and base of dished washer 480 by the application of heat and pressure during assembly.

These and other modifications may be made by those skilled in the art without departing from the scope and spirit of the present invention as pointed out in the appended claims.

What is claimed is:

1. An electrical overvoltage arrester assembly for use in a screw-in type station protector for protecting telephone and the like equipment from voltage surges comprising:

(i) a conductive holder adapted and arranged to be threadably engaged in a station protection base;

(ii) a conductive cage element positioned within said holder;

(iii) biasing means disposed between said cage and holder to urge said cage in the direction away from the holder;

(iv) a gas-tube subassembly positioned in said cage including:

(a) a gas-filled housing including two electrodes defining an ionization gap therebetween, (b) back up air gap means bridging the external surfaces of said two electrodes, said air gap means including first and second conductive element; insulating means defining an aperture therein, said insulating means being interposed between said first and second elements, whereby an air gap is formed therebetween, means maintaining said first and second elements in electrical contact with associated electrodes of said housing; and wherein said first and said second conductive elements and said insulating means are formed as layers, a portion of said first conductive element and a portion of said second conductive element being concentrically disposed about and closing said aperture, said air-gap means further comprising means integrally formed therewith for securing said insulating means to said conductive elements.

2. The assembly of claim 1, wherein one of said electrodes includes a base portion extending outwardly of the holder and radially inwardly of said cage element, and wherein said securing means comprises an adhesive layer.

3. An electrical overvoltage arrester assembly for use in a screw-in type station protector for protecting telephone and the like equipment from voltage surges comprising:

a conductive holder adapted and arranged to be threadably engaged in a station protection base;

a conductive cage element positioned with said holder;

biasing means disposed between said cage and holder to urge said cage in the direction away from said holder;

a gas-tube subassembly positioned in said cage including:

a gas-filled housing including two electrodes defining an ionization gap therebetween;

back up air gap means bridging the external surfaces of said two electrodes, said air gap means including first and second conductive elements, said air gap means further including insulating means defining an aperture therein, said insulating means being interposed between said first and said second elements whereby an air gap is formed therebetween, means maintaining said first and said second elements in electrical contact with associated electrodes of said housing; and wherein said back up air gap means is maintained in contact with at least one of said gas tube electrodes by a plastic material sleeve.

4. The assembly of claim 3, wherein said plastic material sleeve maintains said air gap means in contact with both of said electrodes.

5. The assembly of claim 3, wherein said back-up air gap means is maintained in contact with its associated electrode by means of a metallic clip.

6. The assembly of claim 1, wherein said first and said second conductive elements are copper layers, and wherein said securing means comprises an adhesive layer.

7. The assembly of claim 1, wherein said insulating means is a thermoplastic or thermosetting material which extends beyond the peripheries of said first and said second conductive elements.

8. An electrical overvoltage arrester assembly for use in a screw-in type station protector for protecting telephone and the like equipment from voltage surges comprising:

a conductive holder adapted and arranged to be threadably engaged in a station protection base;

a conductive cage element positioned with said holder;

biasing means disposed between said cage and holder to urge said cage in the direction away from said holder;

a gas-tube subassembly positioned in said cage including:

a gas-filled housing including two electrodes defining an ionization gap therebetween;

back up air-gap means bridging the external surfaces of said two electrodes, said air gap means including first and second conductive elements, said air gap means further including insulating means defining an aperture therein, said insulating means being interposed between said first and said second elements whereby an air gap is formed therebetween, means maintaining said first and said second elements in electrical contact with associated electrodes of said housing; and wherein said insulating means aperture is circular in cross-section and the portion of said conductive layers overlapping said aperture have a generally circular shape concentric with said aperture.

9. An electrical overvoltage arrester assembly for use in a screw-in type station protector for protecting telephone and the like equipment from voltage surges comprising:

a conductive holder adapted and arranged to be threadably engaged in a station protection base;

a conductive cage element positioned with said holder;

biasing means disposed between said cage and holder to urge said cage in the direction away from said holder;

a gas-tube subassembly positioned in said cage including:

a gas-filled housing including two electrodes defining an ionization gap therebetween;

back up air-gap means bridging the external surfaces of said two electrodes, said air gap means including first and second conductive elements, said air gap means further including insulating means defining an aperture therein, said insulating means being interposed between said first and said second elements whereby an air gap is formed therebetween, means maintaining said first and said second elements in electrical contact with associated electrodes of said housing; and wherein said insulating layer includes an adhesive on each surface in the area surrounding said aperture, said adhesive being set back a predetermined distance from the edge of the aperture.

10. The assembly of claim 1, wherein said air gap is about 3 mils, and wherein said securing means comprises an adhesive layer.

11. The assembly of claim 1, wherein the strike voltage of the back up air gap is in the range of about 500 to 1000 volts, and wherein said securing means comprises an adhesive layer, and wherein the depths of said adhesive layer and said insulating means coact to provide the depth of said air gap.

12. A gas tube assembly for use in screw-in well type station protectors comprising:

(a) gas filled surge arrester having two electrodes defining an ionization gap therebetween, said gas tube having a configuration adapted to fit in a conductive holder assembly to fit screw-in well type station protectors;

(b) back up air gap means bridging the external surfaces of said two electrodes, said air gap means including first and second elements; insulating means defining an aperture therein, said insulating means being interposed between said first and said second elements, whereby an air-gap is formed therebetween, means maintaining said first and second elements in electrical contact with associated electrodes of said housing; and wherein (c) said first and said second conductive elements and said insulating means are formed as layers, a portion of said first conductive element and a portion of said second conductive element being concentrically disposed about and closing said aperture, said air gap means further comprising means integrally formed therewith for securing said insulating means to said conductive elements.

13. A gas tube assembly for use in screw-in well type station protectors comprising:

a gas filled surge arrester having two electrodes defining an ionization gap therebetween, said gas tube having a configuration adapted to fit in a conductive holder assembly to fit screw-in well type station protectors;

back up air gap means bridging the external surfaces of said two electrodes, said air gap means including first and second conductive elements, said air gap means further including insulating means defining an aperture therein, said insulating means being interposed between said first and said second elements whereby an air gap is formed therebetween, said air gap means further including means maintaining said first and said second elements in electrical contact with associated electrodes of said housing; and wherein said back up air gap means is maintained in contact with at least one of said gas tube electrodes by a shrinkable plastic material sleeve.

14. The assembly of claim 13, wherein said plastic material sleeve maintains said air gap means in contact with both of said electrodes.

15. The assembly of claim 13, wherein said back-up air gap means is maintained in contact with its associated electrode by means of a metallic clip.

16. The assembly of claim 12, wherein said first and second conductive elements are copper layers, and wherein said securing means comprises an adhesive layer.

17. The assembly of claim 12, wherein said insulating means is a heat shrinkable plastic material.

18. A gas tube assembly for use in screw-in well type station protectors comprising:

a gas filled surge arrester having two electrodes defining an ionization gap therebetween, said gas tube having a configuration adapted to fit in a conductive holder assembly to fit screw-in well type station protectors;

back up air gap means bridging the external surfaces of said two electrodes, said air gap means including first and second conductive elements, said air gap means further including insulating means defining an aperture therein, said insulating means being interposed between said first and said second elements whereby an air gap is formed therebetween, said air gap means further including means maintaining said first and said second elements in electrical contact with associated electrodes of said housing; and wherein said insulating means aperture is circular in cross-section and the portion of said conductive layers overlapping said aperture have a generally circular shape concentric with said aperture.

19. A gas tube assembly for use in screw-in well type station protectors comprising:

a gas filled surge arrester having two electrodes defining an ionization gap therebetween, said gas tube having a configuration adapted to fit in a conductive holder assembly to fit screw-in well type station protectors;

back up air gap means bridging the external surfaces of said two electrodes, said air gap means including first and second conductive elements, said air gap means further including insulating means defining an aperture therein, said insulating means being interposed between said first and said second elements whereby an air gap is formed therebetween, said air gap means further including means maintaining said first and said second elements in electrical contact with associated electrodes of said housing; and wherein said insulating layer includes an adhesive on each surface in the area surrounding said aperture, said adhesive being set back a predetermined distance from the edge of the aperture.

20. The assembly of claim 12, wherein said air gap is about 3 mils, and wherein said securing means comprises an adhesive layer.

21. The assembly of claim 12, wherein the strike voltage of the back up air gap is in the range of about 500 to 1000 volts, and wherein said securing means comprises an adhesive layer, and wherein the depths of said adhesive layer and said insulating means coact to provide the depth of said air gap.

22. The assembly of claim 12, wherein said surge arrester includes:

(a) an insulating tubular member having a central bore;

(b) first conductive end cap means carried on one end of said tubular member and in abutting relationship thereto, said end cap means including a central conductor extending axially thereon into said tubular member to present the free end thereof beyond the other end thereof;

(c) second conductive end cap means carried on said other end of said tubular member, said second end cap means having a portion extending over said free end of said conductor such that a configuration gap is defined therebetween; and (d) said first and second end cap means being joined to said tubular member in gas tight relationship.

23. The gas tube arrester of claim 22, wherein said tubular member is cylindrical in shape.

24. The gas tube arrester of claim 23, wherein said tubular member is a ceramic sleeve.

25. The gas tube arrester of claims 22, 23 or 24, wherein said second end cap means includes a first cylindrical portion bonded to said tubular member and a second cylindrical portion of reduced diameter joined thereto by a shoulder portion, said second portion including a circular portion in juxtaposition to said free end of said conductor, said conductor and said second end cap being sized such that the air gap therebetween is a function of the distance between the end of said tubular member and said shoulder.

26. A gas tube assembly for use in screw-in well type station protectors comprising:

a gas filled surge arrester having two electrodes defining an ionization gap therebetween, said gas tube having a configuration adapted to fit in a conductive holder assembly to fit screw-in well type station protectors, said surge arrester further comprising:

an insulating tubular member having a central bore;

first conductive end cap means carried on one end of said tubular member and in a butting relationship thereto, said end cap means including a central conductor extending axially thereon into said tubular member to present the free end thereof beyond the other end thereof;

second conductive end cap means carried on said other end of said tubular member, this second end cap means having a portion extending over said free end of said conductor such that a configuration gap is defined therebetween; and said first and said second end cap means being joined to said tubular member in gas tight relationship;

back up air gap means bridging the external surfaces of said two electrodes, said air gap means including first and second conductive elements, said air gap means further including insulating means defining an aperture therein, said insulating means being interposed between said first and said second elements whereby an air gap is formed therebetween, said air gap means further comprising means maintaining said first and said second elements in electrical contact with associated electrodes of said housing; and wherein said first conductive element of said air gap means is said second end cap means; and said second conductive element is a conductive cylinder member, said gas tube being disposed therein such that said first end cap means is in electrical contact with said conductor cylinder, said cylinder being operatively coupled to said second end cap means.

27. the assembly of claim 26, wherein said conductor cylinder is coupled to said second end cap means by epoxy resin.

28. The assembly of claim 26, wherein said conductive cylinder is coupled to said second end cap by means of crimping said cylinder into engagement with an insulator interposed between said cylinder and said second end cap means.

29. A gas tube surge arrester assembly comprising:

(a) a two-electrode gas tube surge arrester;

(b) an air gap assembly mounted on one of said electrodes, said assembly including a cylindrical conductor element having a laterally extending flange; a tubular conducting rivet threaded by said conductor element, said rivet being carried by said conductor element and clamping together a concentric stack assembly of: (i) an insulating disc having at least one aperture; (ii) a conductive washer defining a plurality of radially inwardly projecting air gap electrodes; and an insulating ring, said projecting air gap electrode being in register with at least one aperture, whereby at least one air gap is defined between said projecting electrode and said rivet, said rivet partially enveloping said stack assembly to accomplish said clamping together, said stack assembly further including an insulating washer sealingly enclosing said air gap electrodes.

* * * * *